US010922889B2

(12) United States Patent
Palos et al.

(10) Patent No.: US 10,922,889 B2
(45) Date of Patent: Feb. 16, 2021

(54) DIRECTING USER ATTENTION

(71) Applicant: Google LLC, Mountain View, CA (US)

(72) Inventors: Xavier Benavides Palos, San Francisco, CA (US); Brett Barros, Millbrae, CA (US); Paul Bechard, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/249,319

(22) PCT Filed: Nov. 19, 2018

(86) PCT No.: PCT/US2018/061762
§ 371 (c)(1),
(2) Date: Jan. 16, 2019

(87) PCT Pub. No.: WO2019/099979
PCT Pub. Date: May 23, 2019

(65) Prior Publication Data
US 2020/0273251 A1    Aug. 27, 2020

Related U.S. Application Data

(60) Provisional application No. 62/588,739, filed on Nov. 20, 2017.

(51) Int. Cl.
*G06T 15/00*    (2011.01)
*G06T 19/00*    (2011.01)
(Continued)

(52) U.S. Cl.
CPC .............. *G06T 19/006* (2013.01); *G06T 7/70* (2017.01); *G06T 15/80* (2013.01); *G06T 17/20* (2013.01)

(58) Field of Classification Search
CPC ...... G06Q 10/063114; G06Q 30/0281; H04W 4/33; H04W 4/30; H04W 4/024;
(Continued)

(56) References Cited

U.S. PATENT DOCUMENTS 8,854,282 B1 * 10/2014 Wong .................. G02B 27/017
345/8
9,837,052 B2 * 12/2017 Deering ................ G09G 5/391
(Continued)

OTHER PUBLICATIONS

TwnklsAR, Hololens WEMO Operator System, Apr. 21, 2017, https://www.youtube.com/watch?v=ZiNsjslN1o4&feature=emb_logo.*
(Continued)

*Primary Examiner* — Phu K Nguyen
(74) *Attorney, Agent, or Firm* — Brake Hughes Bellermann LLP

(57) ABSTRACT

Systems and methods for drawing attention to points of interest within inserted content are provided. For example, the inserted content may include augmented reality content that is inserted into a physical space or a representation of the physical space such as an image. An example system and method may include receiving an image and identifying content to display over the image. The system and method may also include identifying a location within the image to display the content and identifying a point of interest of the content. Additionally, the example system and method may also include triggering display of the content overlaid on the image by identifying a portion of the content based on the point of interest, rendering the portion of the content using first shading parameters; and rendering the content other than the portion using second shading parameters.

17 Claims, 9 Drawing Sheets

(51) Int. Cl.
  *G06T 7/70* (2017.01)
  *G06T 15/80* (2011.01)
  *G06T 17/20* (2006.01)
(58) Field of Classification Search
  CPC ........ H04N 5/232933; H04N 5/232939; G06T 11/00; G06T 2200/24; G06F 3/0488
  USPC .......................................................... 345/418
  See application file for complete search history.

(56) References Cited

U.S. PATENT DOCUMENTS

| | | | | |
|---|---|---|---|---|
| 10,089,966 | B2* | 10/2018 | Deering | H04N 13/344 |
| 10,225,707 | B1* | 3/2019 | Scheper | G06Q 10/063114 |
| 10,297,088 | B2* | 5/2019 | Rhodes | G06F 3/03545 |
| 2019/0236845 | A1* | 8/2019 | Rhodes | G06F 3/011 |
| 2020/0020308 | A1* | 1/2020 | Deering | G02C 7/04 |
| 2020/0106965 | A1* | 4/2020 | Malia | H04N 5/232933 |

OTHER PUBLICATIONS

HolomiaXR, Microsoft Hololens for real estate marketing—Citadines BIMGroup, Apr. 14, 2017, https://www.youtube.com/watch?v=rj77sOhj3tU.*
Fracture, Hololens—London City Skyline, Oct. 17, 2016, https://www.youtube.com/watch?v=KilkHpM_-b0.*
Allingham, Hololens Works Inspection, Mar. 26, 2017, https://www.youtube.com/watch?v=ykVbCy2ql9A.*
Futurism, HoloLens Repairs Elevators, Sep. 15, 2016, https://www.youtube.com/watch?v=PyCBWgJU68.*
Pang X, Cao Y, Lau RW, Chan AB. Directing user attention via visual flow on web designs. ACM Transactions on Graphics (TOG). Nov. 11, 2016;35(6):1-1.*
GCFLearnFree.org, PowerPoint: Animating Text and Objects, Mar. 17, 2016, https://www.youtube.com/watch?time_continue=1&v=kw_udjD2xwo&feature=emb_logo.*
Modio, Easy Arrows Script for After Effects , Nov. 4, 2016, https://www.youtube.com/watch?v=xtvKNUsUG78.*
Wong Peter, 30 Animation Arrow Flow, Nov. 4, 2009, https://www.youtube.com/watch?v=XLy7tDaS5vU.*
EpicEditingTuts, After Effects Tutorial: Animated arrows (Easy), Aug. 28, 2013, https://www.youtube.com/watch?v=7SL00s6IBU8.*
Chastine, et al., "Studies on the Effectiveness of Virtual Pointers in Collaborative Augmented Reality", IEEE Symposium on 3D User Interfaces, Mar. 8-9, 2008, pp. 117-124, XP031339891.
Hill, "Augmented reality presents storytelling opportunities in weather", NewscastStudio, Jul. 25, 2017, retrieved on Jan. 17, 2019 from https://www.newscaststudio.com/2017/07/25/augmented-reality-weather/2/, pp. 1-7, XP002788066.
International Search Report and Written Opinion for International Application No. PCT/US2018/061762, dated Jan. 30, 2019, 17 pages.
Kolivand, et al., "Realistic Real-Time Outdoor Rendering in Augmented Reality", PLOS ONE, vol. 9, No. 9, e108334, Sep. 30, 2014, 14 pages, XP055543772.

* cited by examiner

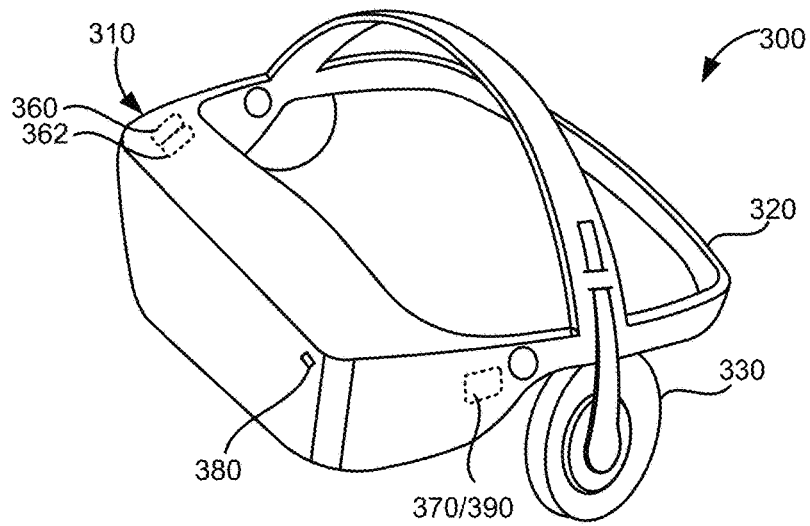
FIG. 3A
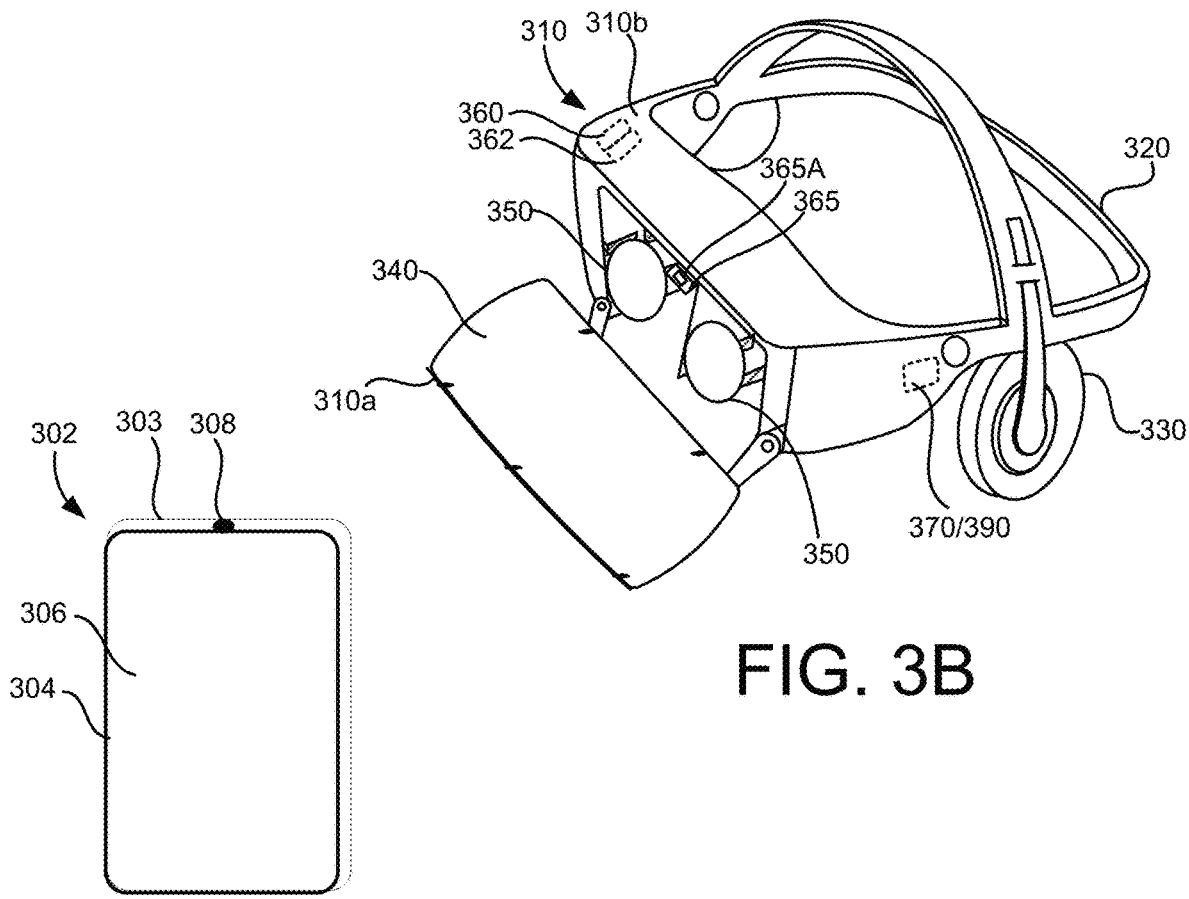
FIG. 3B
FIG. 3C

DIRECTING USER ATTENTION

CROSS-REFERENCE TO RELATED APPLICATION

This application is a 35 U.S.C. § 371 National Phase Entry Application from PCT/US2018/061762, filed on Nov. 19, 2018, designating the United States and claiming priority to U.S. Application No. 62/588,739 filed on Nov. 20, 2017, the disclosures of which are both incorporated herein by reference in their entireties.

BACKGROUND

Content may be inserted into an image or a user's field of view of the physical environment or another three-dimensional (3D) environment. For example, an augmented reality (AR) system may generate an immersive augmented environment for a user by inserting content. The immersive augmented environment can be generated by superimposing computer-generated content on a user's field of view of the real world. For example, the computer-generated content can include labels, textual information, images, sprites, and three-dimensional entities. These images may be displayed at a position in the user's field of view so as to appear to overlay an object in the real world and be spatially retained relative to the real word even when outside of the users' field of view. Similarly, the computer-generated content may be overlaid on a displayed image. In certain applications, such as educational applications, it may be helpful to draw a user's attention to a particular point of interest on the inserted content.

SUMMARY

This disclosure describes systems and methods for directing user attention to points of interest on inserted content, such as augmented reality content, that a user is viewing. For example, a portion of the inserted content that is identified based on a point of interest may be shaded differently than the rest of the content so as to draw the user's attention. Additionally, a pointing entity, such as a conical structure, may be rendered so as to be visible from the user's viewing position and to indicate an appropriate position/direction from which to view the point of interest on the inserted content.

In one aspect, a method comprises: receiving an image; identifying content to display over the image; identifying a location within the image to display the content; identifying a point of interest of the content; and triggering display of the content overlaid on the image by identifying a portion of the content based on the point of interest; rendering the portion of the content using first shading parameters; and rendering the content other than the portion using second shading parameters.

In another aspect, a non-transitory computer-readable storage medium comprising instructions stored thereon that, when executed by at least one processor, are configured to cause a computing system to at least: receive an image; identify content to display over the image; identify a location within the image to display the content; identify a point of interest of the content; trigger display of the content overlaid on the image in a manner that draws attention to the point of interest; generate a pointing entity directed at the point of interest; and trigger display of the pointing entity overlaid on the image.

In yet another aspect, a system comprising: at least one processor; and memory storing instructions that, when executed by the at least one processor, cause the system to: receive an image; identify content to display over the image; identify a location within the image to display the content; identify a point of interest of the content; identify a portion of the content based on the point of interest; render the portion of the content using first shading parameters; render the content other than the portion using second shading parameters; and trigger display of the rendered content overlaid on the image.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Figure 1:
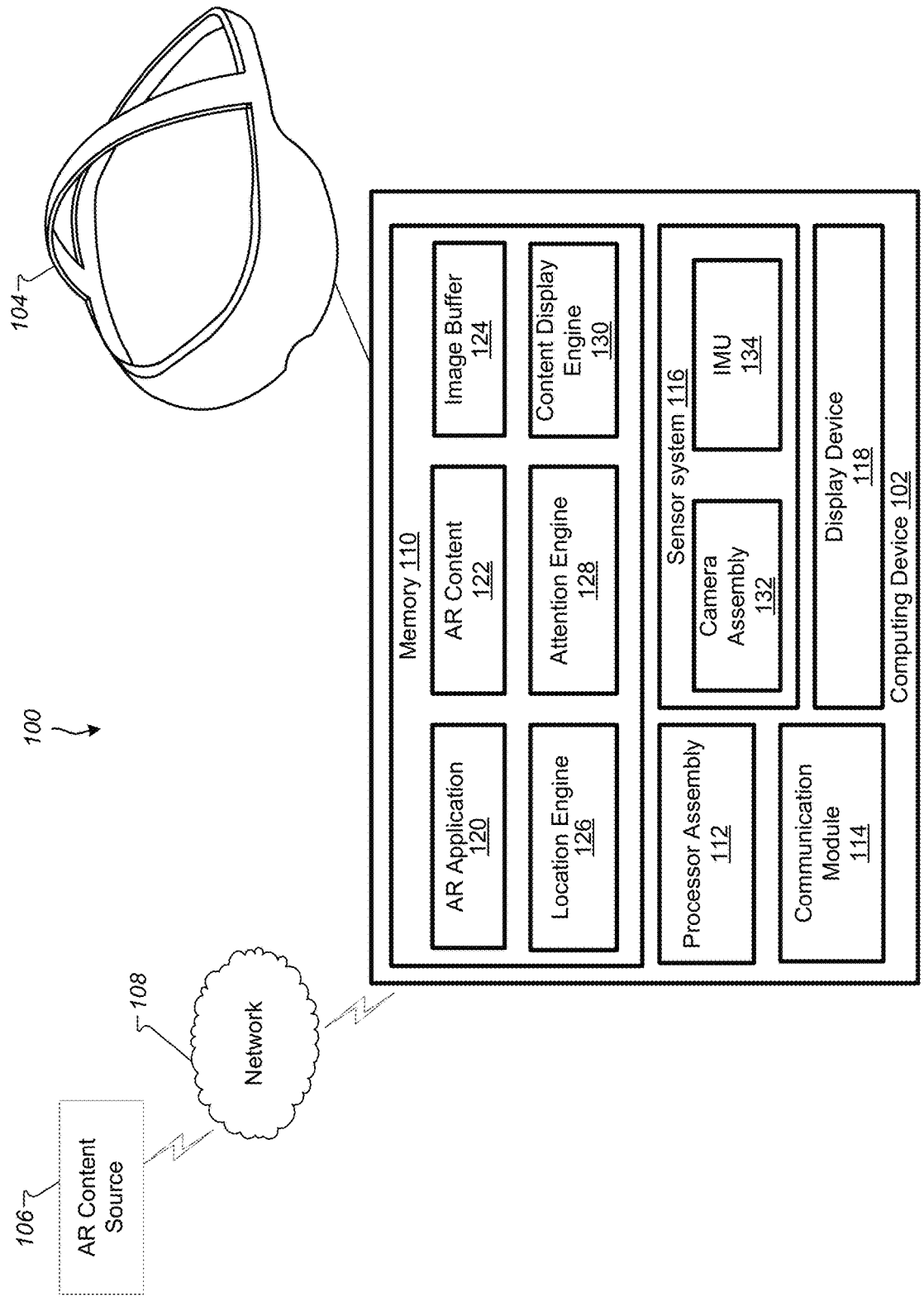
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Augmented reality (AR) systems include systems that insert computer-generated content into a user's perception of the physical space surrounding the user. For example, the inserted content may include three-dimensional structures. In some situations, it may be useful to draw attention to a specific portion (i.e., a point of interest (POI)) of the inserted content. The point of interest may be located anywhere on an inserted three-dimensional structure, including on a sider of the structure that is facing away from a user of the AR system. These POIs may not be visible until the user moves to a new position within the AR environment. Additionally, even when the user is in a position to view the POI, it may be difficult for the user to identify the POI without modifying or interfering with viewing of the POI. Thus, technical problems exist in AR systems when it comes to directing user attention to specific points of interest within AR content. Embodiments disclosed herein provide technical solutions to this technical problem by causing the AR environment to be displayed in a manner that draws attention to a specific POI. For example, the POI or a region of the AR content surrounding the POI may be rendered using shading parameters that are different than the shading parameters for rest of the AR environment. In some implementations, the POI may be rendered using ordinary shading while the rest of the AR environment is rendered using dimmer shading. Beneficially, the different shading parameters can draw attention to the POI without altering the appearance of the POI. Some implementations also cause a pointing entity to be displayed that points to the POI. The pointing entity may be generated based on the position of a user such that from the users point-of-view the pointing entity directs the user to the POI. Beneficially, the pointing entity may help a user identify and locate POIs that are on a side of the AR content that does not face the user.

FIG. 1 is a block diagram illustrating a system 100 according to an example implementation. The system 100 generates an augmented reality (AR) environment for a user of the system 100. In some implementations, the system 100 includes a computing device 102, a head-mounted display device (HMD) 104, and an AR content source 106. Also shown is a network 108 over which the computing device 102 may communicate with the AR content source 106.

The computing device 102 may include a memory 110, a processor assembly 112, a communication module 114, a sensor system 116, and a display device 118. The memory 110 may include an AR application 120, AR content 122, an image buffer 124, a location engine 126, an attention engine 128, and a content display engine 130.

The AR application 120 may insert computer-generated content into a user's perception of the physical space surrounding the user. The computer-generated content may include labels, textual information, images, sprites, and three-dimensional entities. In some implementations, the content is inserted for entertainment, educational, or informational purposes. As an example, an augmented reality system may allow students to take a virtual field trip. During the virtual field trip, students may be able to view content representing artifacts, animals, or other entities using augmented reality.

The AR application 120 may display the content in a manner that draws attention to a POI. For example, the system may generate a spotlight effect for the POI. In some implementations, the spotlight effect includes using different shading parameters to render a region of the content surrounding the POI and rendering a pointing entity that is similar in appearance to a cone of light that would emanate from a spotlight.

As discussed above, the AR application 120 may display the content using different shading parameters so as to distinguish the point of interest from the other parts of the content. For example, the point of interest may be rendered with shading parameters that are lighter than the other parts of the content. In this manner, the point of interest may appear to have a spotlight directed at it. For example, pixels that correspond to portions of the content that are within a predetermined threshold distance from a three-dimensional coordinate associated with the POI may be rendered using lighter shading parameters than the other parts of the content. In some implementations, pixels that are outside of the predetermined threshold are rendered with shading parameters that reduce the lightness of the pixels (e.g., the color values of the pixels are scaled by a multiplier that is less than 1.0, such as 0.7) surrounding the point of interest. The use of differential shading parameters may have several benefits over using a directional light source when rendering the content to draw attention to the POI. First, the differential shading parameters allow a curved (e.g., roughly circular, spherical region) to be identified without regard to the location of the directional light source. In contrast, a directional light source would generally result in an oval-shaped region being identified based on distortion due to the angle of incidence from the light source. Second, the differential lighting allows for the entirety of a complex geometrical shape (e.g., a tree branch with leaves) to be identified without regard for shadows (e.g., caused by other parts of the complex geometry). Additionally, using the differential lighting may use fewer processing cycles than using a directional light source as the directional light source may impact surfaces beyond the POI and require additional rendering resources.

Some implementations of the AR application 120 can generate a pointing entity to draw the user's attention to the POI. The pointing entity may help a user find the POI from a distance and determine a viewing angle or position from which to observe the POI. The pointing entity may be especially beneficial in situations where the POI is on a surface of the content that does not face toward the user and thus the differential shading of the POI cannot be seen by the user. In these situations, the pointing entity may still be visible to the user and may help the user identify a position relative to the content from which the POI may be observed. In some implementations, the pointing entity is generated as a conical structure having a conical vertex (or point) disposed at a vertical offset above or below the content. In this manner, at least a portion of the pointing entity will not be occluded by the content. In some implementations, the offset is below the content when the normal vector of the surface of the content is pointed downward and the offset is above the content when the normal vector of the surface of the content is pointed upward.

The AR application 120 may also offset the conical vertex laterally from the content so that the conical structure of the pointing entity appears to point laterally in toward the POI. In some implementations, the position of the conical vertex of the conical structure is selected, at least in part, so as to have a component that is perpendicular to the user's view axis. As the user moves, the position of the conical vertex may be moved too. In some implementations, the conical structure (or portions of it) may be rendered as partially transparent. For example, a transparency gradient may be applied to the conical structure where the conical vertex is rendered with low or no transparency and the conical base is rendered as fully transparent. The transparency level may increase gradually along the cone from the conical vertex to the base. In this manner, the conical base of the conical structure will not occlude the user's view of the POI while the conical vertex will be visible to guide the user to the POI.

Additionally, some implementations of the AR application 120 draw a user's attention to a POI when the user is not facing the content. In these implementations, an orb light source may be generated in the user's peripheral field of view so as to indicate a direction the user should turn to face. Additionally, a glowing orb or shimmer may move through an AR or virtual reality (VR) environment to guide a user to inserted content and/or a POI associated with that content. In some implementations, a pointing entity may grow when the user is orientated so that the pointing entity is in the periphery of a user's field of view. The pointing entity may then shrink slowly as the user turns toward the pointing entity. In this way, as the user's orientation aligns toward the pointing entity, the pointing entity gets smaller and points more precisely to the desired target POI.

The AR application 120 may allow a teacher or guide can facilitate the virtual field trip and may, for example, select, switch, or otherwise manage the content shown to a group of students or visitors during the virtual field trip. Alternatively, a user may independently explore the content of the virtual field trip without a teacher or guide. In some implementations, as the virtual field trip progresses the content shown at a particular physical location changes. For example, a set of content may be displayed sequentially at a particular location, and the content displayed at a particular location may change in response to a user input or based on a particular amount of time elapsing. In some implementations, the teacher or guide can view a 2D map of the content and POIs associated with the content. The teacher or guide may then select the POI on the 2D map to activate a pointing entity for that POI.

In some implementations, the AR application 120 may cause content to be displayed that includes multiple POIs, and the AR application 120 may be configured to sequentially draw the user's attention to those POIs. For example, a first POI may be selected (e.g., based on an order determined in a tour, based on proximity to the user, or based on an input from a teacher or tour guide user). After the user has reached and viewed the first POI, the differential shading and pointing entity associated with that POI may be removed. Thereafter, differential shading may be applied to the second POI and a pointing entity may be generated for the second entity, and so on. In some implementations, the pointing entity may move from the first POI to a second POI (e.g., the pointing entity may float through the AR environment from the first POI to the second POI).

The AR application 120 may cause the computing device 102 to captures images of the physical space surrounding a user. The AR application 120 may then determine a physical location at which to insert content within the captured image/s. For example, the AR application 120 may identify a physical marker such as a QR code, picture, sticker, or other type of visual indicator within the physical space. The sticker may be formed from a paper of vinyl material and an adhesive, which may be used to permanently or temporarily attach the sticker to a surface in the physical space. The stickers may be configured to allow for removal and reattachment within the physical space.

In some implementations, the AR application 120 may determine the physical location based on a coordinate system being mapped to the captured image/images based on determining a location of the computing device 102 based on using, for example, a visual positioning system or global positioning system. Content may then be identified to insert at the physical location. The content may include one or more POIs and when the content is inserted, the content may be displayed in a manner to draw a user's attention to that POI, such as by emulating a spotlight directed at the POI.

The HMD 104 may include a display device that is positioned in front of a user's eyes. For example, the HMD 104 may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD 104 includes a chamber in which the computing device 102 (e.g., a portable electronic device, such as a smartphone) may be placed so as to permit viewing of the display device of the computing device 102 through the HMD 104. In some implementations, the HMD 104 may be configured to generate a VR environment too.

As another example, the HMD 104 may permit a user to see the physical space while the HMD is being worn. The HMD 104 may include a micro-display device that displays computer-generated content that is overlaid on the user's field of view. For example, the HMD 104 may include an at least partially transparent visor that includes a combiner that permits light from the physical space to reach the user's eye while also reflecting images displayed by the micro-display device toward the user's eye.

Some implementations may not include an HMD 104. In at least some of these implementations, the computing device 102 is a portable electronic device, such as a smartphone, that includes a camera and a display device. The AR application 120 may cause the portable electronic device may capture images using the camera and show AR images on the display device that include computer-generated content overlaid upon the images captured by the camera.

Although many examples described herein relate to an AR application, such as the AR application 120, directing user attention to POIs on inserted content, the techniques described herein may be incorporated in other types of systems too. For example, the techniques described herein may be used to draw user attention to POIs in a VR environment or within an image or video.

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance and/or proximity sensor, a contact sensor such as a capacitive sensor, a timer, and/or other sensors and/or different combination(s) of sensors.

The IMU 134 detects motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's gaze direction and head movement.

In some implementations, the AR application may use the sensor system 116 to determine a location and orientation of a user within a physical space and/or to recognize features or objects within the physical space.

The AR application 120 may present or provide AR content to a user via the HMD and/or one or more output devices of the computing device 102 such as the display device 118, speakers, and/or other output devices. In some implementations, the AR application 120 includes instructions stored in the memory 110 that, when executed by the processor assembly 112, cause the processor assembly 112 to perform the operations described herein. For example, the AR application 120 may generate and present an AR environment to the user based on, for example, AR content, such as the AR content 122 and/or AR content received from the AR content source 106. The AR content 122 may include content such as images or videos that may be displayed on a portion of the user's field of view in the HMD 104. For example, the AR application 120 may generate content corresponding to a virtual field trip for one or more users (e.g., for example the AR application 120 may coordinate display of AR content with other computing devices). The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images.

The AR application 120 may use the image buffer 124, location engine 126, attention engine 128, and content display engine 130 to generate images for display via the HMD 104 based on the AR content 122. The AR content may be associated with (or include) one or more POIs. For example, one or more images captured by the camera assembly 132 may be stored in the image buffer 124. The AR application 120 may use the location engine 126 to determine one or more physical locations within the images to insert content. For example, the location engine 126 may analyze the images to identify features within the image so that the images can be mapped to a coordinate system associated with physical locations for displaying content. Additionally, the location engine 126 may analyze the images to identify markers associated with physical locations for displaying content. The markers and/or coordinates of physical locations may be defined by a user during a setup process.

Once a physical location has been identified, the content display engine 130 can then display content at the identified physical location. In some implementations, the attention engine 128 may direct the content display engine 130 to use various parameters for displaying the content, such as differential shading parameters, to direct the user's attention to a POI on the content. Additionally, the attention engine 128 may generate a pointing entity, such as a conical structure, to point toward the POI and/or a light source to guide the user toward the POI. The AR application 120 may for example determine which content to display at any given time, when to update/change the content, which POI to draw the user's attention to, and when to switch to another POI. In some implementations, the AR application 120 may simultaneously display different content at multiple different physical locations identified by the location engine 126.

In some implementations, the image buffer 124 is a region of the memory 110 that is configured to store one or more images. In some implementations, the computing device 102 stores images captured by the camera assembly 132 as a texture within the image buffer 124. The image buffer may also include a memory location that is integral with the processor assembly 112, such as dedicated random access memory (RAM) on a GPU.

In some implementations, the location engine 126 and content display engine 130 may include instructions stored in the memory 110 that, when executed by the processor assembly 112, cause the processor assembly 112 to perform operations described herein to generate an image or series images that are displayed to the user (e.g., via the HMD 104).

The AR application 120 may update the AR environment based on input received from the camera assembly 132, the IMU 134, and/or other components of the sensor system 116. For example, the IMU 134 may detect motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's position and orientation within a physical space. Based on the detected position and orientation, the AR application 120 may update the AR environment to reflect a changed orientation and/or position of the user within the environment.

The memory 110 can include one or more non-transitory computer-readable storage media. The memory 110 may store instructions and data that are usable to generate an AR environment for a user.

The processor assembly 112 includes one or more devices that are capable of executing instructions, such as instructions stored by the memory 110, to perform various tasks associated with generating an AR environment. For example, the processor assembly 112 may include a central processing unit (CPU) and/or a graphics processor unit (GPU). For example, if a GPU is present, some image/video rendering tasks, such as adjusting and rendering content and pointing entities, may be offloaded from the CPU to the GPU.

The communication module 114 includes one or more devices for communicating with other computing devices, such as the AR content source 106. The communication module 114 may communicate via wireless or wired networks, such as the network 108.

The camera assembly 132 captures images and/or videos of the physical space around the computing device 102. The camera assembly 132 may include one or more cameras. The camera assembly 132 may also include an infrared camera. Images captured with the camera assembly 132 may be used to determine a location and orientation of the computing device 102 within a physical space, such as an interior space. For example, the computing device 102 may include a visual positioning system that compares images captured by the camera assembly 132 (or features extracted from those images) to a known arrangement of features within a physical space to determine the location of the computing device 102 within the space.

The computing device 102 may also include various user input components (not shown) such as a controller that communicates with the computing device 102 using a wireless communications protocol. In some implementations, the computing device 102 is a mobile device (e.g., a smartphone) which may be configured to provide or output AR content to a user via the HMD 104. For example, the computing device 102 and the HMD 104 may communicate via a wired connection (e.g., a Universal Serial Bus (USB) cable) or via a wireless communication protocol (e.g., any WiFi protocol, any BlueTooth protocol, Zigbee, etc.). In some implementations, the computing device 102 is a component of the HMD 104 and may be contained within a housing of the HMD 104.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit video signals and/or audio signals to the HMD 104 for display for the user, and the HMD 104 may transmit motion, position, and/or orientation information to the computing device 102.

The AR content source 106 may generate and output AR content, which may be distributed or sent to one or more computing devices, such as the computing device 102, via the network 108. In an example implementation, the AR content includes three-dimensional scenes and/or images. Additionally, the AR content may include audio/video signals that are streamed or distributed to one or more computing devices. The AR content may also include an AR application that runs on the computing device 102 to generate 3D scenes, audio signals, and/or video signals.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
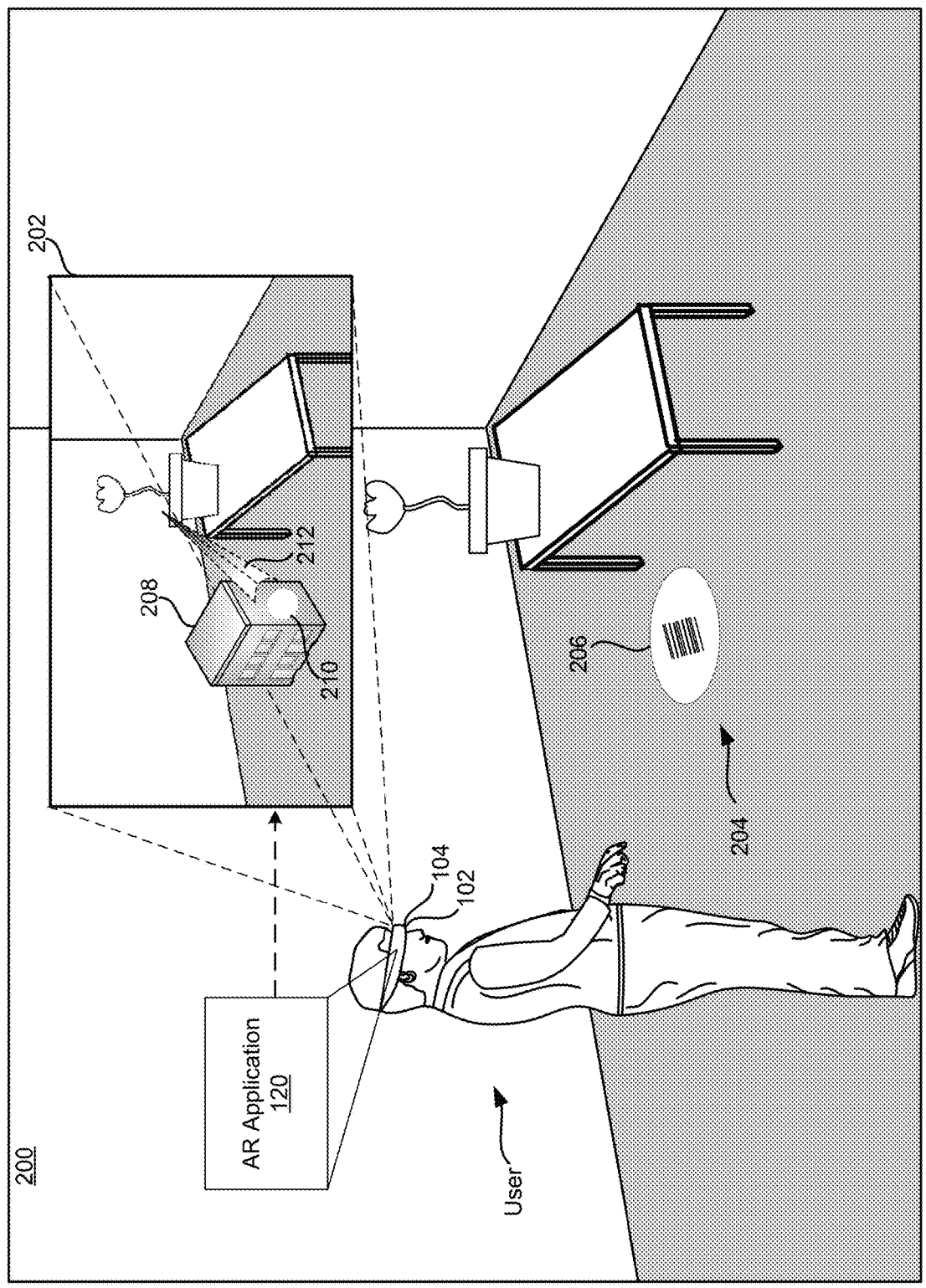
FIG. 2 is a third person view of an example physical space, in which a user is experiencing an AR environment through the example HMD of FIG. 1.

FIG. 2 is a third person view of an example physical space 200, in which a user is experiencing an AR environment 202 through the example HMD 104. The AR environment 202 is generated by the AR application 120 of the computing device 102 and displayed to the user through the HMD 104.

The physical space 200 includes a physical location 204 that is identified by a marker 206. In this example, the marker 206 includes a barcode disposed on a circular object. The location engine 126 may identify the middle of the circular object to identify a physical location, and the AR application 120 may identify content to display at that physical location in the AR environment 202 based, for example, on the barcode from the marker 206. Additionally or alternatively, the marker 206 may include a QR code, an image, or a sticker.

For example, the marker 206 may have been placed in the physical space 200 by a teacher or guide. Although this example includes a marker 206, some implementations identify the physical location 204 without a marker (e.g., based on the position and/or orientation of the computing device 102 as determined using a global positioning system (GPS), visual positioning system, other location determining technology, and/or sensors of the IMU). Further, the marker 206 does not necessarily include an identifier (e.g., barcode, QR code, etc.) in some implementations.

The AR environment 202 includes inserted content 208 that includes a point of interest (POI) 210 and a pointing entity 212 that is displayed over an image of the physical space 200. In this example, the content 208 is a building and the POI 210 is a feature on a side of the building. The pointing entity 212 has a conical structure around an axis directed at the POI 210 in this example. The conical vertex of the pointing entity 212 is further away from the POI 210 than the conical base of the pointing entity 212. Additionally, the pointing entity 212 is displayed with a transparency gradient in which the conical structure is fully opaque near the conical vertex and becomes fully transparent near the base. In FIG. 2, the higher degree of transparency is shown with darker shading and the higher degree of opacity is shown with lighter shading. As can also be seen, the conical base of the pointing entity 212 is offset above the POI 210.

In some implementations, the AR environment 202 is provided to the user as a single image or a pair of stereoscopic images that occupy substantially all of the user's field of view and are displayed to the user via the HMD 104. In other implementations, the AR environment is provided to the user by displaying/projecting the inserted content 208 on an at least partly transparent combiner that occupies at least a portion of the user's field of view. For example, portions of the HMD 104 may be transparent, and the user may be able to see the physical space 200 through those portions while the HMD 104 is being worn.

FIGS. 3A and 3B are perspective views of an example HMD 300, such as, for example, the HMD 104 worn by the user in FIG. 2, and FIG. 3C illustrates an example handheld electronic device 302 for controlling and/or interacting with the HMD 300.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a conical base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the conical base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical space relative to the augmented environment, and/or may be displayed to the user on the display 340 in a pass through mode, allowing the user to temporarily leave the augmented environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to detect and track the user's head gaze direction and movement.

In some implementations, the HMD 300 may include a gaze tracking device 265 to detect and track an eye gaze of the user. The gaze tracking device 365 may include, for example, an image sensor 365A, or multiple image sensors 365A, to capture images of the user's eyes, for example, a particular portion of the user's eyes, such as, for example, the pupil, to detect, and track direction and movement of, the user's gaze. In some implementations, the HMD 300 may be configured so that the detected gaze is processed as a user input to be translated into a corresponding interaction in the AR or VR environment.

In some implementations, the HMD 300 includes a portable electronic device, such as a smartphone, that is removably disposed within a chamber of the housing 310. For example, the display 340 and the camera 380 may be provided by the portable electronic device. When the chamber is closed (as shown in FIG. 3A), the display 340 is aligned with the lenses 350 so that a user can view at least a portion of the display 340 (provided by the portable electronic device) through each eye. The camera 380 may align with an aperture in the housing 310 so that the portable electronic device of the HMD 300 can capture images while disposed in the housing 310.

Figure 4:
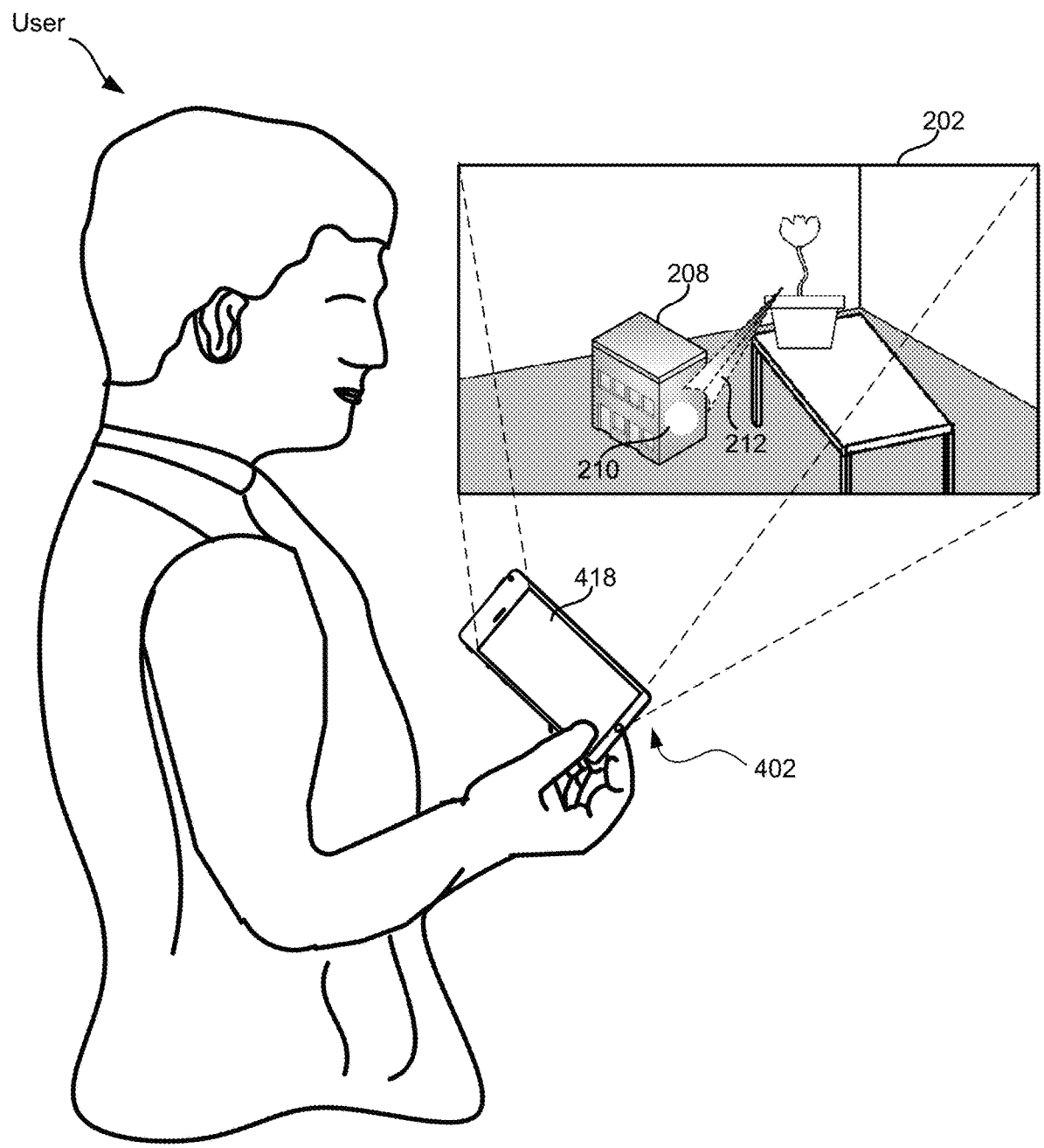
FIG. 4 is a schematic view of a user experiencing the AR environment via an example portable electronic device.

FIG. 4 is a schematic view of a user experiencing the AR environment 202 via an example portable electronic device 402. The portable electronic device 402 is an example of the computing device 102. The portable electronic device 402 may be a smartphone, a tablet, or another type of portable computing device. In this example, the user is experiencing the AR environment through a display device 418 of the portable electronic device. For example, the display device 418 may include a screen that can show images and/or videos.

Figure 5:
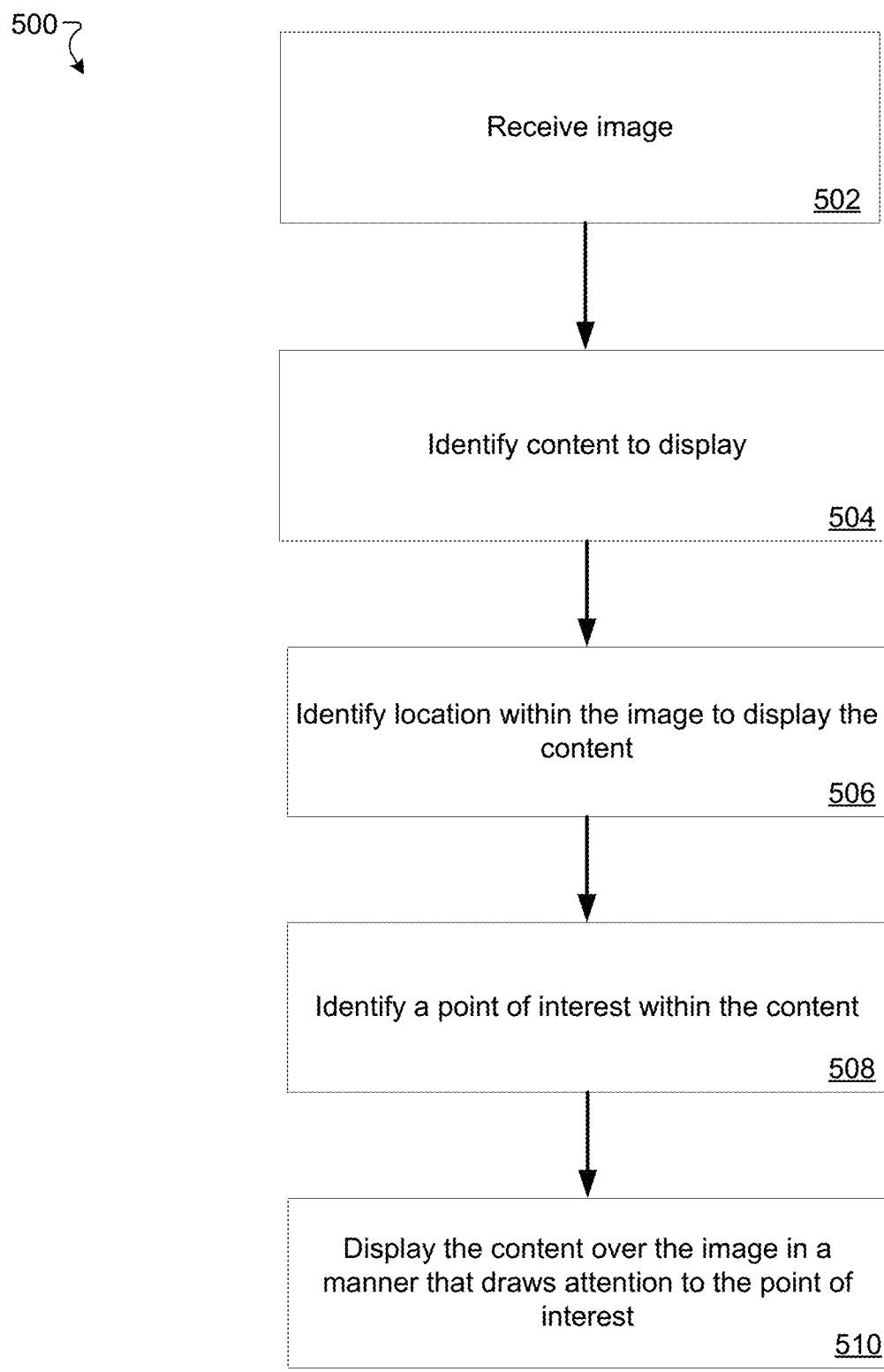
FIG. 5 is a diagram of an example method of inserting content and drawing attention to a POI, in accordance with implementations described herein.

FIG. 5 is a diagram of an example method 500 of inserting content and drawing attention to a POI, in accordance with implementations described herein. This method 500 may for example be performed by the computing device 102 to provide a virtual field trip or tour experience using an AR environment for a user.

At operation 502, an image is received. For example, the image may be captured by a camera assembly of a computing device, such as the computing device 102. The captured image may be stored as a texture in the image buffer 124. In some implementations, the image may be received from a storage location such as a computer-readable memory device or from another computing device via a network.

At operation 504, content to display is identified. The content may be identified based on a predefined virtual tour of field trip. For example, the virtual tour or field trip may define a sequence of content to display. Initially, the first content from the sequence is identified for display. Thereafter, the content identified for display may be updated to the next content in the sequence in response to a user input (e.g., from a teacher or guide) or based on a predetermined time period elapsing.

At operation 506, a location to display the content is identified within the image. As described previously, the physical location may be identified based on a marker or based on a physical coordinate determined with respect to the location of the computing device 102. Based on the identified physical location, a three-dimensional coordinate in the AR environment may be identified. The identified content may be displayed at the identified location in a particular orientation, which may be configured by, for example, a teacher, tour guide, or user who has setup a virtual tour.

At operation 508, a POI within the content to display is identified. The POI can be anything a teacher, tour guide, or anyone else would like to draw attention to. For example, the POI may be an architectural feature of the building shown in FIG. 2. The POI may be positioned anywhere on the content. Depending on the user's point of view and the orientation of the content, the POI may be disposed on a portion of the content that is not facing toward the user. Additionally, in some implementations, multiple POIs are associated with the content. In these implementations, one of those POIs may be identified initially.

At operation 510, the content is displayed over the image in a manner that draws attention to the identified POI. For example, a light sphere effect (e.g., using differential shading parameters) may be applied to the content when it is rendered so that a portion of the content associated with (or near) the POI is displayed using brighter lighting settings than the rest of the content. If the POI is on a side of the content the user can see, the user would then see the POI as a bright spot on the content. Additionally, in some implementations, a pointing entity is rendered to draw the user's attention to a POI. For example, the pointing entity may help the user find a POI that is located on a side of the content that cannot be seen from the user's current position. In some implementations, the light sphere and pointing entity generate a spotlight-like effect.

Figure 6:
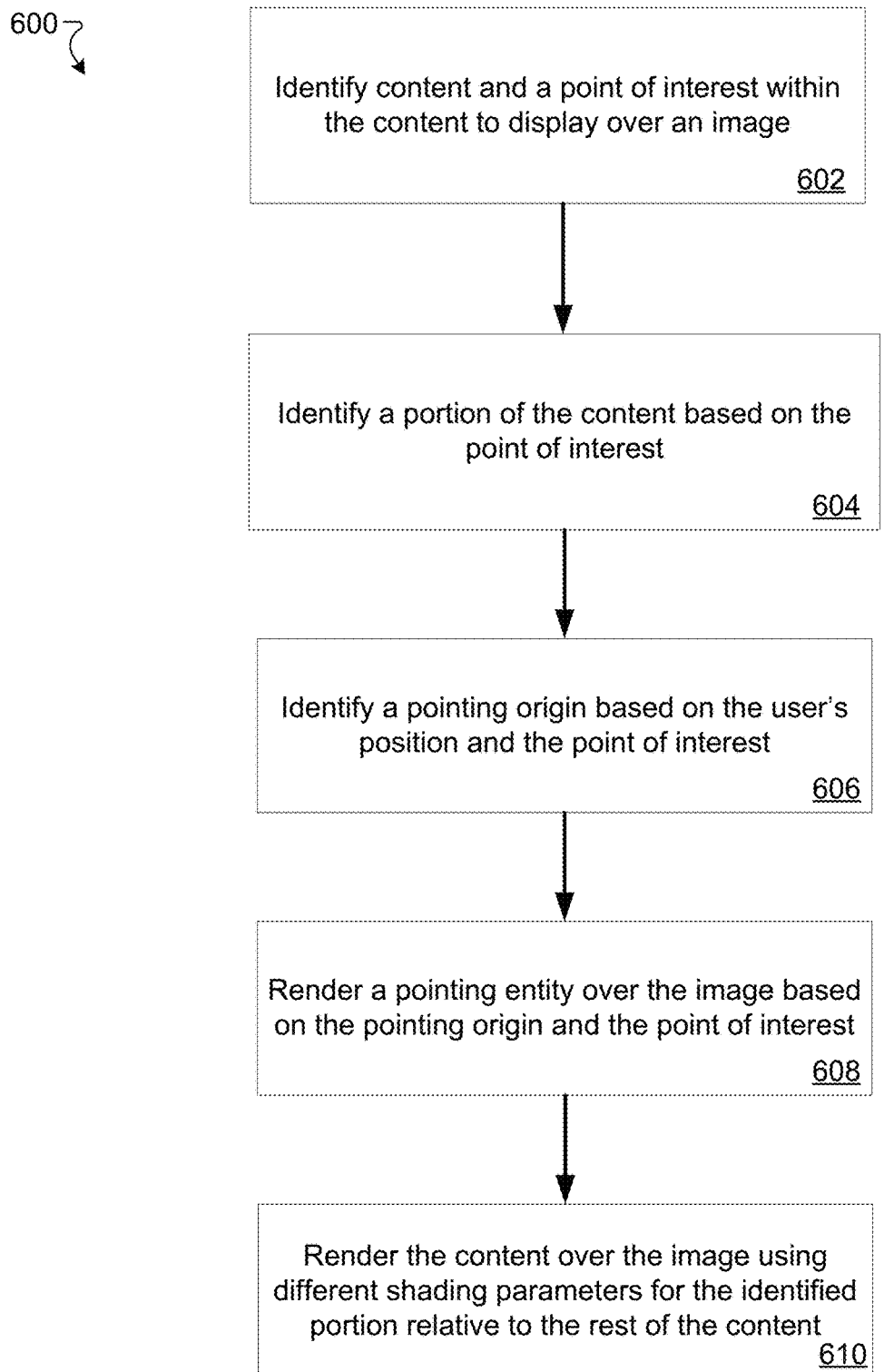
FIG. 6 is a diagram of an example method of inserting content and drawing attention to a POI, in accordance with implementations described herein.

FIG. 6 is a diagram of an example method 600 of inserting content and drawing attention to a POI, in accordance with implementations described herein. This method 600 may, for example, be performed by the computing device 102 to provide a virtual field trip or tour experience using an AR environment for a user.

Figure 7A:
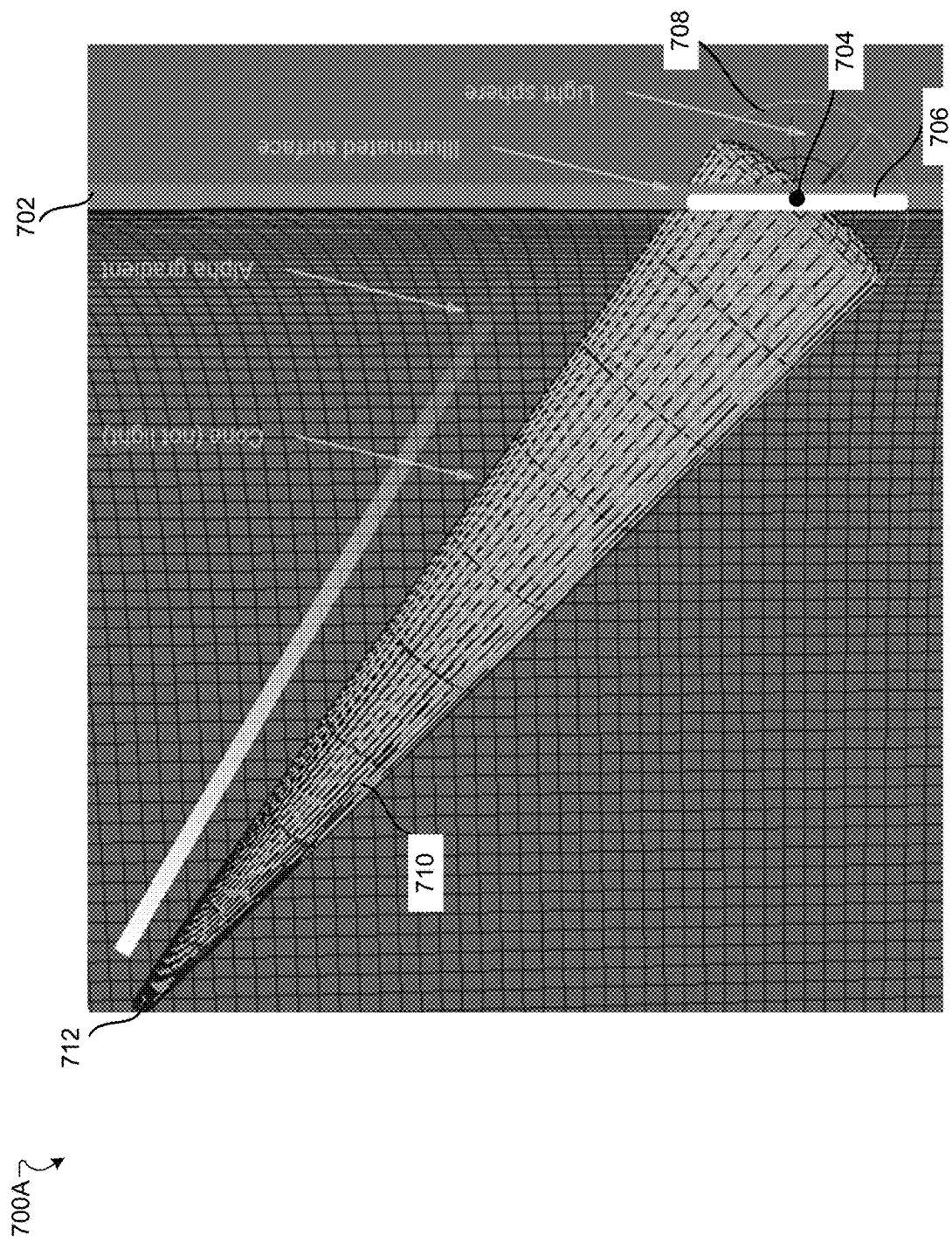
FIGS. 7A-7B are schematic diagrams of content with a POI being displayed in accordance with implementations as described herein.
Figure 7B:
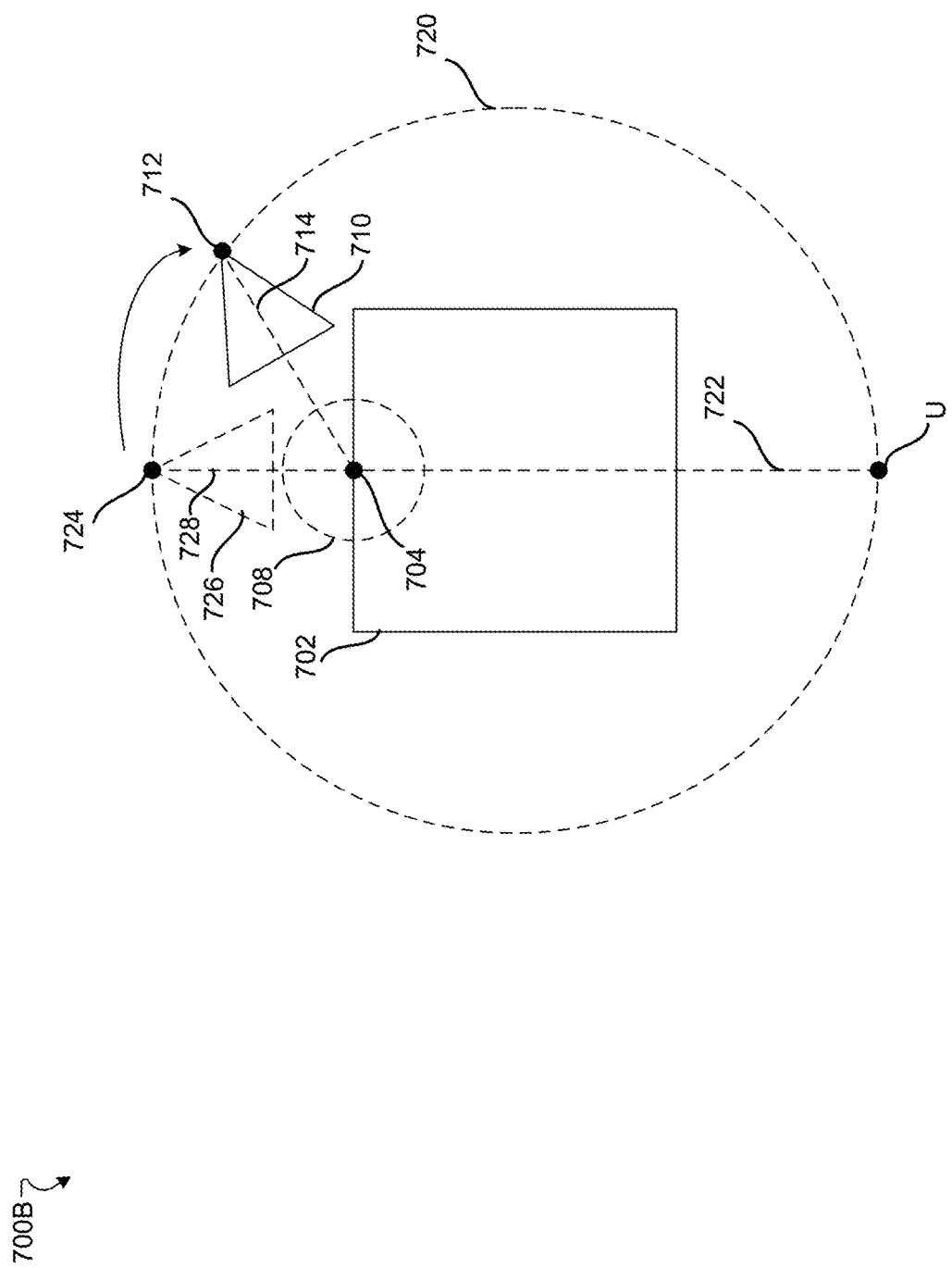
Figure 8:
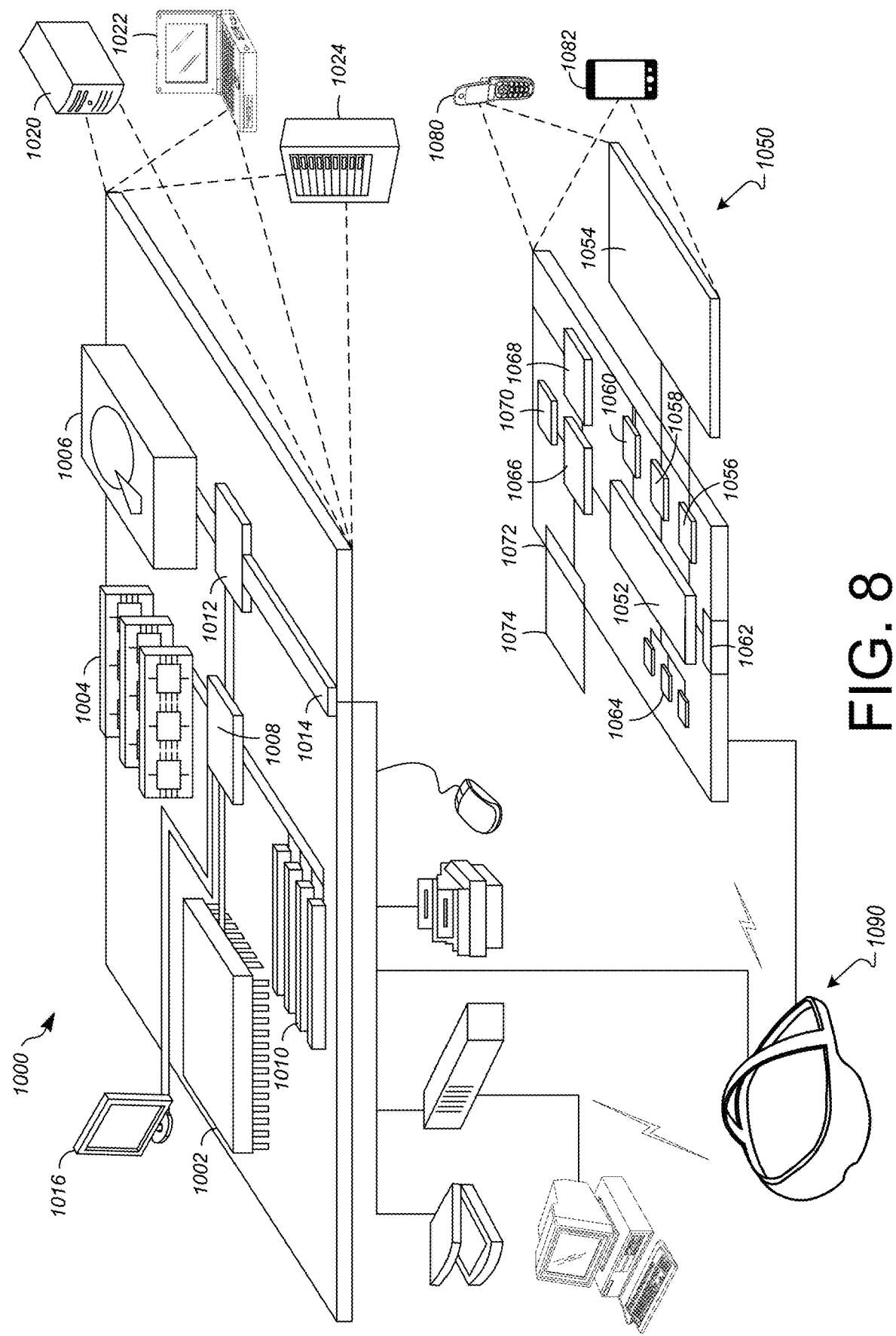
FIG. 8 shows an example of a computer device and a mobile computer device that can be used to implement the techniques described herein.

At operation 602, content to display over an image and a POI within the content are identified. Examples of identifying content and POIs are described with respect to FIG. 5. An illustration 700A of a side view of an example of identified content 702 and a POI 704 on the content 702 are shown in FIG. 7A. The content 702 and POI 704 are also shown in FIG. 7B, which provides an overhead view.

At operation 604, a portion of the content is identified based on the POI. For example, the portion may be identified based on distance to a three-dimensional coordinate associated with the POI. In some implementations, the portion is identified based on a sphere surrounding the POI (e.g., all parts of the content that are within a pre-determined threshold distance from the three-dimensional coordinate are identified as the portion). In FIG. 7A, an example identified portion 706 is shown. The example identified portion 706 is identified based on being contained within a sphere 708 that is centered at the POI 704.

At operation 606, a pointing origin is identified based on the user's position and the point of interest. An example pointing entity 710 having a pointing origin 712 is shown in FIG. 7A. The pointing origin 712 may be the location at which the pointing entity 710 appears to originate. The pointing entity 710 may be aligned with an axis running between the pointing origin 712 and the POI 704. For example, FIG. 7B shows an axis 714 around which the pointing entity 710 is disposed.

In some implementations, the pointing origin 712 is vertically offset from the content 702 so that the pointing entity 710 appears to originate above or below the content 702. In some implementations, the vertical offset is a static value. In other implementations, the vertical offset is determined based on the vertical dimension of the content and the user's position with respect to the content. For example, a vertical offset may be determined so that the pointing origin 712 is not occluded in the user's field of view by content 702. Thus, a larger vertical offset may be selected when the user is nearer to the content 702 and/or when the content has a larger vertical dimension. Additionally, the direction of the vertical offset may be determined based on the normal vector of the surface of the content at the POI. For example, the vertical offset may be negative (below) when the normal vector of the surface has a component that is directed downward and the vertical offset may be positive (above) when the normal vector of the surface has a component that is directed upward.

In some implementations, the pointing origin 712 is also laterally offset from the content 702. For example, FIG. 7B illustrates one technique for laterally offsetting the pointing origin 712. A circle 720 is disposed around the content 702. In some implementations, the circle 720 may be centered at a midpoint of the content 702. Additionally, the circle may be sized to fully contain the content. In some implementations, the circle is further scaled by a pre-determined factor that is greater than 1 (e.g., 1.5, 2.0). In this example, the circle 720 is approximately 50% greater than a circle that would fully contain the content 702 (i.e., a scaling factor of approximately 1.5 is used). In other implementations, different scaling factors can be used. A line is projected from the user U through the POI 704 to the circle 720 to generate an initial pointing origin 724. The initial pointing origin 724 can be used to calculate an initial pointing entity 726 around an initial pointing axis 728.

In some implementations, an angle between the initial pointing axis 728 and the line 722 is determined. In this example, the initial point axis 728 is colinear with the line 722 so that angle is zero. If the angle is less than a predetermined factor, the initial pointing origin 724 may be shifted along the perimeter of the circle 720. In this example, the initial pointing origin 724 is shifted to the pointing origin 712.

For example, the pointing origin 712 may be shifted by a pre-determined factor (e.g., 30 degrees) to one side or another of the user. In some implementations, the side is selected to indicate the direction the user should walk to get to the POI (e.g., the path around the content on the right side may be shorter than on the left side). As can be seen in FIG. 7B, after shifting, the pointing axis 714 would not be colinear with a line between the user and the POI 704. In this manner, when the pointing entity 710 is displayed, it will not be pointing directly at the user. Instead, the user will see an angled/side view of the pointing entity 710, which may be more helpful in determining where to move to see the POI 704. In some implementations, as the user moves, the location of the pointing origin 710 is updated.

In some implementations, the pointing origin 710 may be determined at least in part based on the normal direction of the surface of the content at the POI (or the average normal of the surface of the content surrounding the POI). The pointing origin 710 may also be shifted or moved so that it does not pass through the user. In some implementations, when the user is in the path of the pointing entity, the pointing entity may not be rendered anymore. In some implementations, the pointing origin may also be determined based on properties of the actual physical location. For example, the pointing origin may be aligned with a known light source in the room or another common location in the physical location (e.g., such as a teacher's desk or a physical location of a teacher or guide). In some implementations, the content may be rotated to align the POI with lighting of the room (e.g., if there is a single light source in the physical room). The pointing entity and pointing origin may also be associated with a physical device (e.g., the teacher or guide's smartphone) and may move around as the device moves. Additionally, the pointing entity may be connected to a flashlight function of the smartphone (e.g., when the teacher enables a flashlight on a smartphone, the pointing entity is activated).

In some implementations, users may add POIs, which may then be shared with other users in the AR or VR environment. For example, the user may touch a portion of a screen corresponding to a desired POI on the screen of a smartphone. As another example, a teacher or guide may view a representation of all of the users in the VR or AR environment with pointing entities emanating from each of the user toward the area that user is focusing on in the AR or VR environment. In this manner, the teacher or guide may learn about or observe what participants are interested in and how the participants interact with the AR or VR environment.

At operation 608, a pointing entity is rendered over the image based on the pointing origin and the POI. As described above, in some implementations, the pointing entity is aligned with a pointing axis (i.e., a line from the pointing origin to the POI). The pointing axis may be determined based on the surface normal of the content at (or near) the POI. For example, the pointing entity may be oriented based on the surface normal. The pointing axis may also be determined, at least in part, based on the position of the user. For example, the pointing axis may be determined so as to increase the projection of the pointing axis onto a view plane of the user.

The pointing entity may have a conical shape that is centered around the pointing axis. The conical-shaped pointing entity may have a conical vertex at the pointing origin that expands to a conical base in the direction of the POI. In some implementations, the pointing entity may be rendered with a gradually transitioning transparency. For example, the conical vertex may have a lower transparency value (e.g., the conical vertex may be completely opaque) and the conical base may have a higher transparency value (e.g., the conical base may be completely transparent).

FIG. 7A shows an example of the conical shape of the example pointing entity 710 and an alpha (transparency) gradient that is applied to the pointing entity 710. In some implementations, the pointing entity is not rendered at all when the user is facing the POI and can see the POI as the pointing entity may no longer be necessary to guide the user to the POI.

At operation 610, the content is rendered over the image using different shading parameter for the identified portion relative to the rest of the content. In some implementations, the identified portion is rendered using a first shading factor, while the rest of the content is rendered using a second shading factor. The shading factors may be multiplied by the color values of the pixels that are being rendered. A higher shading factor will result in a pixel that appears brighter. For example, the first shading factor may be greater than the second shading factor so that the pixels within the identified portion are brighter than the rest of the content. This may have the effect of causing the POI to appear within a sphere of light. In some implementations, the first brightness factor is 1.0 and the second brightness factor is 0.7. Because the first brightness factor is 1.0, the colors within the identified portion are not modified, but the portion still appears brighter in comparison to the rest of the content. Beneficially, this may preserve the original coloring of the POI and prevent wash-out of the colors due to bright lighting. FIGS. 7A and 7B show an example of the sphere 708 used to identify the portion 706, which appears more brightly than the rest of the content 702.

Although the operations of the methods 500 and 600 are described sequentially, at least some of the operations may be performed in different orders or simultaneously.

FIG. 9 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of a computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with an AR headset/HMD device 1090 to generate an augmented environment for viewing inserted content within the physical space. For example, one or more sensors included on a computing device 1050 or other computing device depicted in FIG. 9, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. The actions could alter the display of content for a single user or for multiple users (e.g., a teacher or guide's actions may alter the display of content for all users participating in the virtual tour or field trip). In the example of the laser pointer in a AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen to interact with the AR environment. For example, the touchscreen may include user interface elements such as sliders that can control properties of the AR environment, such as selecting a POI or adjusting the brightness with which a POI is displayed. The user interface elements may also allow a user to switch how content is scaled (e.g., switching from scaling based on a relative scale to a real-world scale). Some implementations also respond to 2D touch screen gestures such as pinches or swipes to change the content (e.g., to scale, rotate, or switch content or display properties). For example, a user can interact with the touchscreen in a particular manner that can mimic what happens on the touchscreen with what happens in the AR space. For example, a user may use a pinching-type motion to zoom/scale content displayed on the touchscreen. This pinching-type motion on the touchscreen can cause information provided in the AR space to be zoomed/scaled. Additionally, in some implementations, the computing device 1050 may support 3D gestures in the physical world. For example, reaching the computing device 1050 out into displayed content may be interpreted as a particular input by the computing device 1050. Actuating a physical button, touchscreen virtual button, or other user actuatable input (e.g., a squeeze or shake motion) of the computing device may be recognized as another input by the computing device 1050. Some implementations treat combinations of these actions as gestures that correspond to commands within the AR environment. For example, some implementations may scale content in response to a user reaching out the computing device into a defined volume, squeezing the computing device, and pulling the computing device back. As another example, a casting motion while holding the computing device 1050 may be recognized as a command to grab an item.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   receiving an image;
   identifying content to display over the image;
   identifying a location within the image to display the content;
   identifying a point of interest located on the content; and
   triggering display of the content overlaid on the image by:
      identifying a portion of the content based on the point of interest located on the content;
      inserting the portion of the content including the point of interest in the image using first shading parameters; and
      inserting the content other than the portion in the image using second shading parameters, wherein the first shading parameters correspond to a higher level of lighting than the second shading parameters.

2. The method of claim 1, further comprising:
   generating a pointing entity directed at the point of interest; and triggering display of the pointing entity overlaid on the image.

3. The method of claim 1, wherein the point of interest is associated with a three-dimensional coordinate and identifying the portion of the content includes identifying the portion of the content disposed within a predetermined threshold distance of the three-dimensional coordinate.

4. The method of claim 3, wherein the content includes a three-dimensional mesh that includes a plurality of facets defined by a plurality of vertices.

5. The method of claim 4, wherein the identifying the portion of the content disposed within the predetermined threshold distance includes identifying vertices within the pre-determined threshold distance of the three-dimensional coordinate.

6. The method of claim 3, wherein the identifying the portion of the content disposed within the predetermined threshold distance includes identifying pixels corresponding to portions of the content within the predetermined threshold distance of the three-dimensional coordinate.

7. A non-transitory computer-readable storage medium comprising instructions stored thereon that, when executed by at least one processor, are configured to cause a computing system to at least:
    receive an image;
    identify content to display over the image;
    identify a location within the image to display the content;
    identify a point of interest located on the content;
    trigger display of the content overlaid on the image by:
        identifying a portion of the content based on the point of interest located on the content,
        inserting the portion of the content including the point of interest in the image using first shading parameters, and
        inserting the content other than the portion in the image using second shading parameters, wherein the first shading parameters correspond to a higher level of lighting than the second shading parameters;
    generate a pointing entity directed at the point of interest; and
    trigger display of the pointing entity overlaid on the image.

8. The non-transitory computer-readable storage medium of claim 7, wherein the pointing entity is a conical structure having an axis along a line passing through the point of interest.

9. The non-transitory computer-readable storage medium of claim 8, wherein the conical vertex of the conical structure is further from the point of interest than the conical base of the conical structure.

10. The non-transitory computer-readable storage medium of claim 9, wherein the conical base of the conical structure is separated from the point of interest by an offset distance.

11. The non-transitory computer-readable storage medium of claim 9, wherein the instructions configured to cause the computing system to trigger display of the pointing entity include instructions configured to cause the computing system to render at least a portion of the pointing entity with partial transparency.

12. The non-transitory computer-readable storage medium of claim 11, wherein the instructions configured to cause the computing system to render at least the portion of the pointing entity with partial transparency include instructions configured to cause the computing system to render the conical structure using a transparency gradient, wherein the conical base is more transparent than the conical vertex.

13. The non-transitory computer-readable storage medium of claim 7, wherein the instructions configured to cause the computing system to generate the pointing entity directed at the point of interest include instruction configured to cause the computing system to:
    determine a surface normal direction of the content based on the point of interest; and
    orient the pointing entity based on the surface normal direction.

14. The non-transitory computer-readable storage medium of claim 7, wherein the pointing entity is oriented based on a position of a user.

15. A system comprising:
    at least one processor; and
    memory storing instructions that, when executed by the at least one processor, cause the system to:
        receive an image;
        identify content to display over the image;
        identify a location within the image to display the content;
        identify a point of interest located on the content;
        identify a portion of the content based on the point of interest located on the content;
        insert the portion of the content including the point of interest in the image using first shading parameters;
        insert the content other than the portion in the image using second shading parameters, wherein the first shading parameters correspond to a higher level of lighting than the second shading parameters; and
        trigger display of the inserted content overlaid on the image.

16. The system of claim 15, wherein the point of interest is associated with a three-dimensional coordinate and the instructions that cause the system to identify the portion of the content includes instructions that cause the system to identify the portion of the content disposed within a predetermined threshold distance of the three-dimensional coordinate.

17. The system of claim 15, wherein the instructions further cause the system to:
    generate a pointing entity directed at the point of interest; and
    trigger display of the pointing entity overlaid on the image.

* * * * *